United States Patent [19]

Charboneau

[11] Patent Number: 4,654,646
[45] Date of Patent: Mar. 31, 1987

[54] MODULAR LIQUID LEVEL SENSOR HAVING INTEGRAL ELECTRONICS

[75] Inventor: Ben J. Charboneau, Wixom, Mich.

[73] Assignee: Wickes Manufacturing Company, Southfield, Mich.

[21] Appl. No.: 704,347

[22] Filed: Feb. 22, 1985

[51] Int. Cl.⁴ .................... G08B 21/00; B60Q 1/00
[52] U.S. Cl. ................................. 340/691; 340/59; 340/620; 340/622
[58] Field of Search ............... 340/59, 622, 620, 691, 340/618; 73/304 R, 295

[56] References Cited

U.S. PATENT DOCUMENTS

| | | | |
|---|---|---|---|
| 4,283,719 | 8/1981 | Williams et al. | 340/620 |
| 4,476,714 | 10/1984 | Barry et al. | 340/59 |
| 4,506,258 | 3/1985 | Charboneau et al. | 340/59 |
| 4,518,956 | 5/1985 | Kitagawa et al. | 340/59 |

OTHER PUBLICATIONS

Tarpley, R. W. et al., "Solid-State Automotive Liquid Level Sensing System", SAE publication 800127.

Primary Examiner—Glen R. Swann, III
Attorney, Agent, or Firm—A. Thomas Kammer

[57] ABSTRACT

A liquid level sensor is provided which includes a base assembly and a dipstick assembly. The base assembly includes an electronic printed circuit board assembly, electrical connections to both the dipstick assembly and a wiring harness, and a mounting assembly for securing it to an engine dipstick tube. The dipstick assembly includes a cap, a tube, and a sensor element. The cap is designed to provide the necessary keying and locking features to mate with the base assembly. The tube provides protection for lead wires which connect the sensing element to the printed circuit board assembly.

19 Claims, 6 Drawing Figures

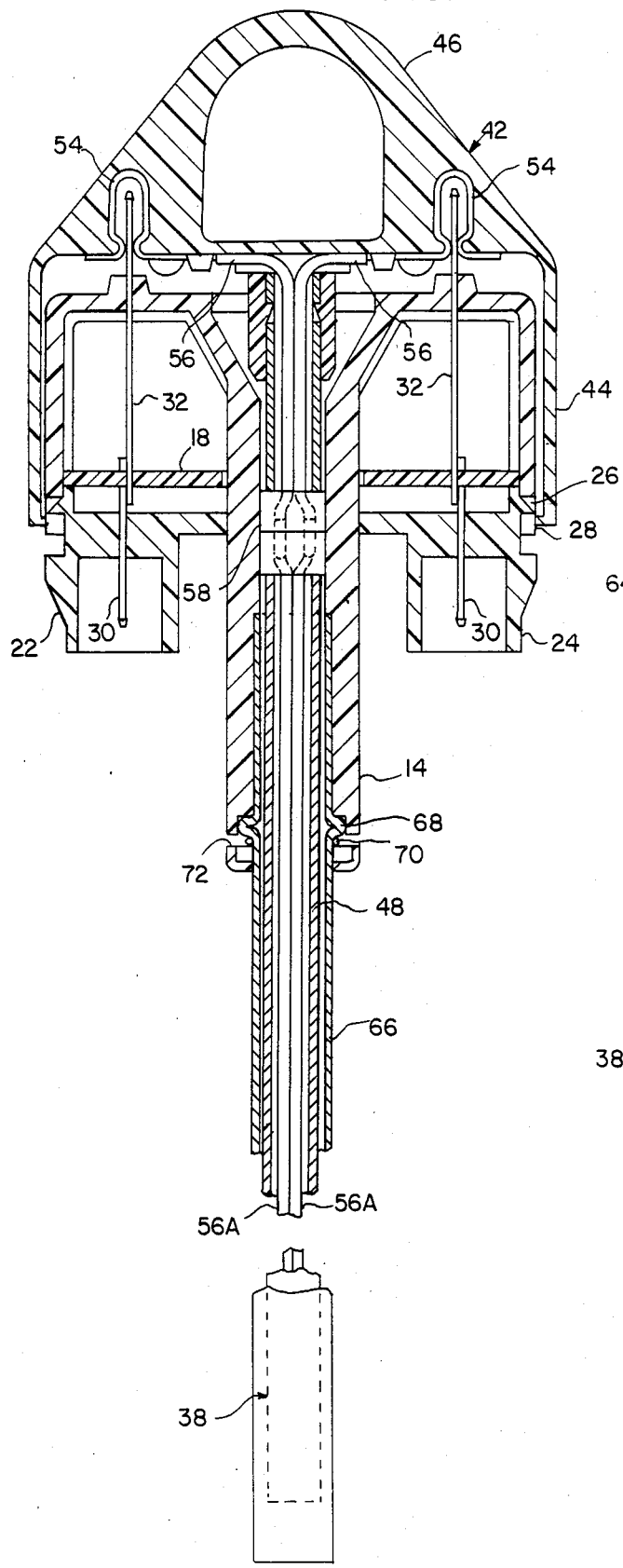
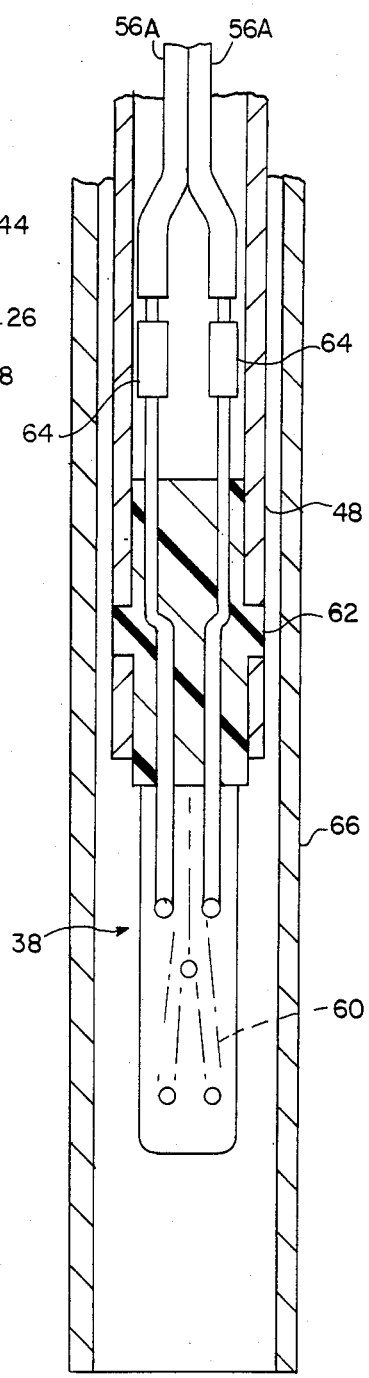
FIG. 4
FIG. 5

MODULAR LIQUID LEVEL SENSOR HAVING INTEGRAL ELECTRONICS

BACKGROUND OF THE INVENTION

The field of the invention relates to liquid level detection.

Fluid level detection in motor vehicles has generally been accomplished manually by checking the appropriate dipstick. Since they too often are not checked at regular intervals, the fluid levels can become much too low before being detected. This can result in excessive wear to one or more vehicle parts or poor vehicle operation.

A number of devices here have been proposed for the automatic detection of low fluid levels so that a driver can be alerted before trouble occurs. One such device is disclosed in SAE publication 800127 by R. W. Tarpley et al. entitled *Solid-State Automotive Liquid Level Sensing System*. This article proposes the use of a positive temperature coefficient silicon chip having a current passed therethrough. U.S. Pat. No. 4,283,719 discloses a probe and a system for detecting the current passing therethrough.

SUMMARY OF THE INVENTION

A liquid level sensing assembly is provided having modular components and integral electronics which allow it to be easily installed within a motor vehicle. The assembly includes a housing incorporating certain electronic components, a cap detachably mounted to the housing, a tube secured to the cap, a sensing element and conductors positioned within the tube, the conductors extending between the sensing element and the cap, and electrical connection means for establishing a connection between the conductors and the electronic components. The housing may include sockets including pin connectors. Connection to a power source, an indicator, and to ground may accordingly be made.

In addition to the cap and tube being separable from the housing, they may also be separable from each other to allow easy replacement of the sensing element or cap should either become damaged. A plug connector may be used for this purpose.

BRIEF DESCRIPTION OF THE DRAWINGS

FIG. 4 is a sectional side elevation view thereof;

FIG. 5 is an enlarged view of the distal end portion thereof; and

DETAILED DESCRIPTION OF THE INVENTION

Figure 6:
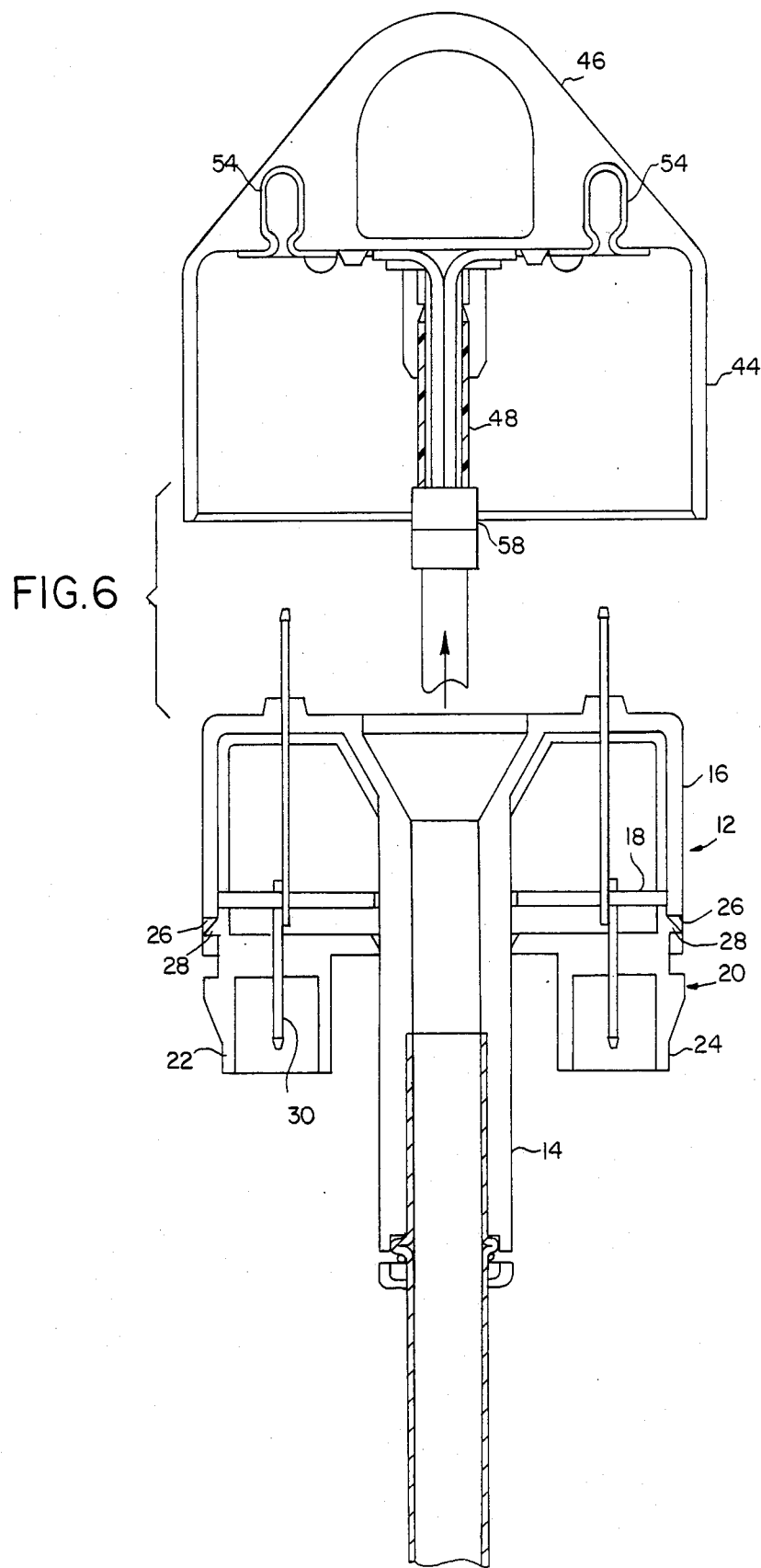
FIG. 6 is a sectional side elevation view thereof illustrating the cap detached from the housing.

A liquid level sensor 10 is provided for detecting the levels within an oil pan, a transmission fluid pan, or any other vessel where maintenance of a minimum fluid level is important. The sensor includes a housing 12 having a cylindrical base 14 and an integral enclosure 16 (FIG. 6). The housing is made from a plastic material (e.g. nylon) that will withstand the temperatures (up to 300° F.) encountered under the hood. A printed circuit board 18 is positioned within the enclosure. A closure member 20 including a pair of sockets 22, 24 prevents moisture or contaminants from entering the enclosure. The PC board 18 is mounted to the closure member 20 so that it may be installed therewith as part of the housing 12. A plurality of slots 26 are provided within the side walls of the enclosure to receive each of a plurality of tapered retention members 28 extending laterally from the closure member 20 (see FIG. 4). The latter is accordingly mechanically locked into position.

Figure 1:
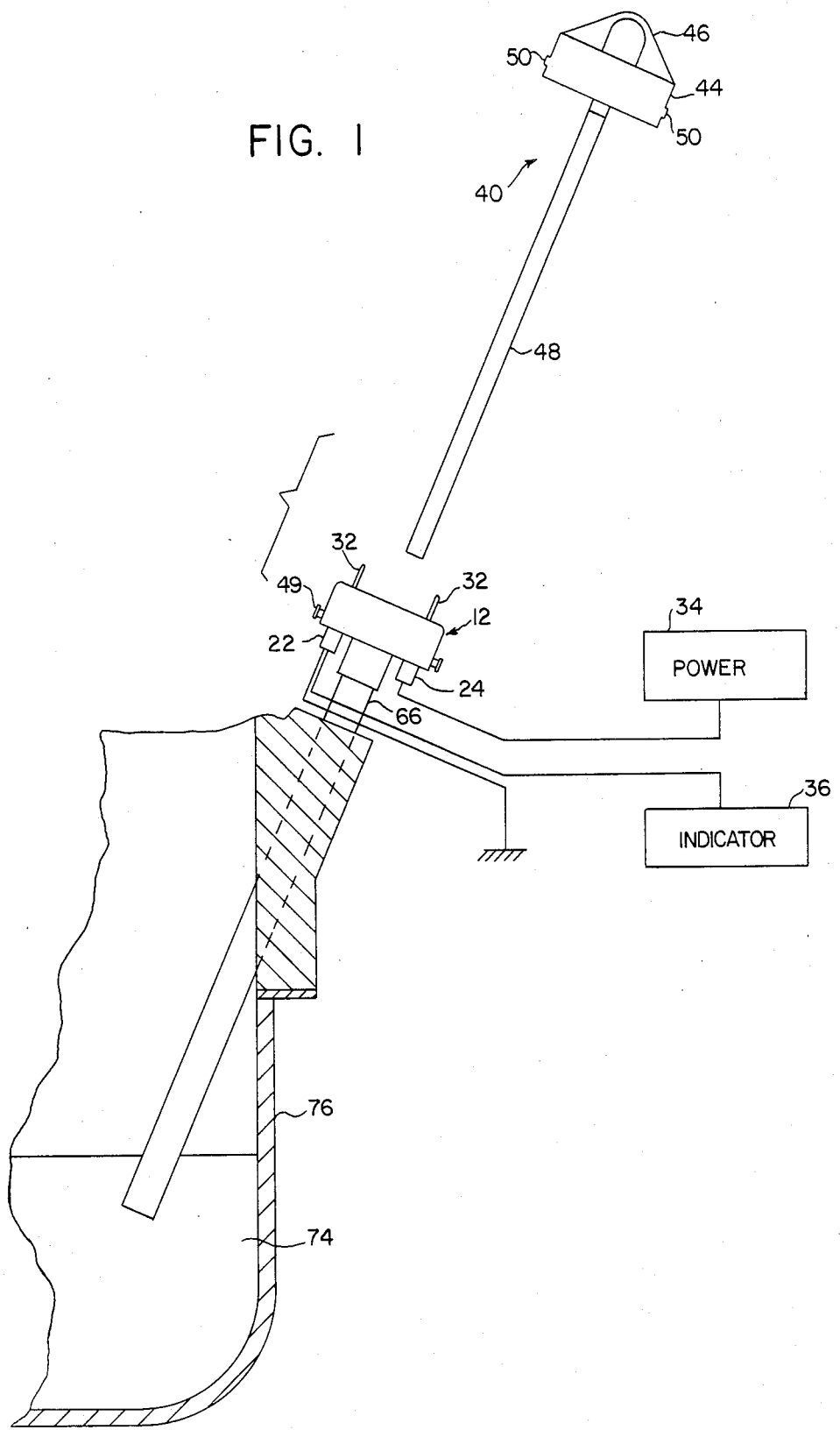
FIG. 1 is a partially sectional schematic view illustrating a liquid level sensor used in one particular manner.
Figure 2:
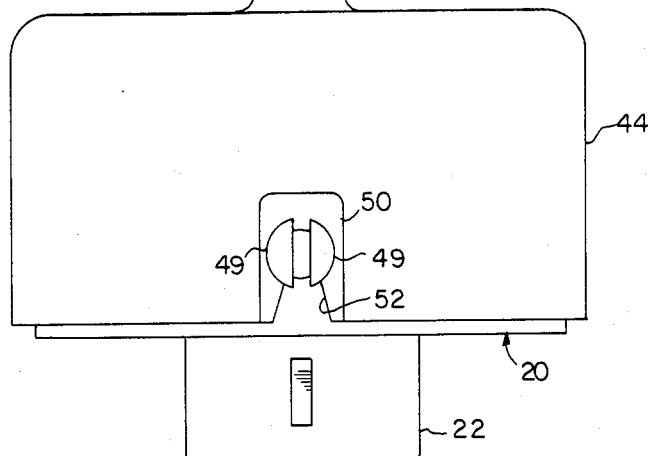
FIG. 2 is a partially cutaway front elevation view of a sensor according to the invention.
Figure 3:
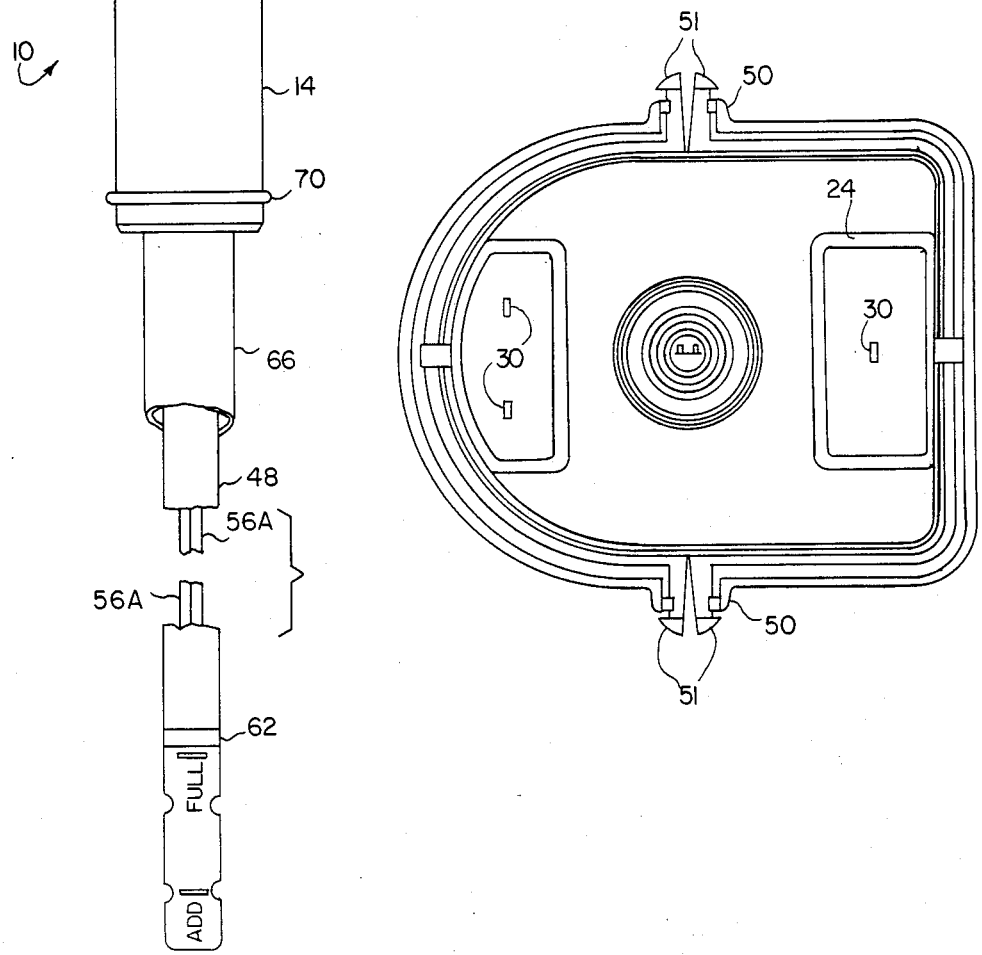
FIG. 3 is a bottom view thereof.

As shown in FIG. 3, one socket 22 includes two connecting pins 30 while the other 24 includes only one. A single three-pin socket connector could alternatively be employed. Each connecting pin 30 is soldered to the PC board 18. A second pair of pins 32 (FIG. 4) is also soldered to the PC board and extends through a pair of openings in the upper wall of the enclosure 16.

The PC board includes a circuit such as one of those shown and described in U.S. Pat. No. 4,506,258 for a "System For Detecting Low Liquid Level And Probe Therefor." This application is incorporated by reference herein. It will be appreciated that other circuits could alternatively be employed in conjunction with the construction described herein.

Connecting pins 30 connect the circuit printed on the board to a power source 34, an indicator 36, and to ground. The second pair of pins 32 connect the board to a sensing device 38 (FIGS. 4 and 5) as described in said U.S. Pat. No. 4,506,258.

A dipstick assembly 40 is provided for taking both manual and automatic readings of a fluid level. As seen in FIG. 4, the assembly includes a cap 42 having a base portion 44, a handle 46, and a plastic tube 48. The tube 48 is preferably resilient, but it may be rigid if bending is not necessary. The base 44 and handle 46 may be made from the same material as the housing 12.

As shown in FIG. 3, both the cap 42 and the walls of the enclosure 16 have substantially the same asymmetrical cross-sectional shape. This insures the cap will always be oriented correctly when placed thereon. Each opposing flat wall of the enclosure includes a pair of diverging stop members 49 projecting therefrom. The corresponding flat walls of the cap each have a slotted projection 50 which receives the body portions of a pair of stop members. The head portion of each stop member is positioned outside the slot 52. By virtue of the converging side walls defining each slot, each pair of stop members are urged towards each other as the cap is moved into place. The end walls of the slots 52 engage the stop members 49 to prevent damage to the second pair of pins 32.

A pair of female terminals 54 are provided within the cap 42 for receiving the pins 32. Each terminal is connected to a conductor 56 which extends with the tube 48. The conductors may either be connected directly to the sensing device 38 at the opposite end of the tube or to a plug 58 which allows the tube to be disassembled near its connection to the cap. A pair of conductors 56A extends from the plug 58 to a convoluted wire 60 which defines the sensing device. The wire is made from a positive temperature coefficient metal as described more fully in U.S. Pat. No. 4,506,258. A plug 62 and a pair of connector sleeves 64 allows the bottom portion of the tube to be removed together with the sensing device 38.

The sensor 10 is installed upon an engine dipstick tube 66 by sliding the cylindrical base 14 of the housing thereon. As shown in FIG. 4, the passage through the base includes a pair of shoulders formed therein for respectively engaging the top of the dipstick tube and a protruding ring 68 extending therefrom. A wire clip 70 positioned within a pair of slots 72 within the base 14 locks the housing 12 in position.

In operation, the dipstick assembly is connected both mechanically and electrically to the housing 12 as shown in FIG. 4. Current accordingly may flow from the power source 34 to ground through wire 60. The circuit printed on board 18 detects whether wire 60 is partially or completely submerged in the fluid 74 within the oil pan 76 and provides an appropriate signal to the indicator 36.

Manual readings are obtained simply by removing the dipstick assembly 40 from the dipstick tube 66 and observing the liquid residue at the base of the plastic tube 48. Indicia are provided near the base for indicating the proper range for the fluid level.

What is claimed is:

1. A liquid level sensor comprising:
a housing defining an enclosure therein;
an electronic circuit assembly positioned within said enclosure for detecting input signals and producing output signals in response thereto;
a cap detachably securable to said housing, said cap including a handle member and an elongate tube extending from said handle member;
a sensing device positioned near one end of said tube, said sensing device being sensitive to the presence or absence of a liquid;
conductor means extending through said tube from said sensing device; and
means for electrically connecting and disconnecting said circuit assembly and said conductor means as said cap is secured to and removed from said housing.

2. A sensor as described in claim 1 wherein said housing includes a base portion having a passage therethrough, said passage being of sufficient diameter to receive said elongate tube of said cap.

3. A sensor as described in claim 2 wherein said passage is cylindrical.

4. A sensor as defined in claim 2 including means for securing said base portion to an engine dipstick tube.

5. A sensor as defined in claim 1 wherein said electronic circuit assembly includes a printed circuit board positioned within said enclosure.

6. A sensor as defined in claim 1 including a socket by said housing.

7. A sensor as defined in claim 1 including a female terminal within said cap, said conductor means being connected between said female terminal and said sensing device.

8. A sensor as defined in claim 7 including a connector pin connected to said circuit assembly and extending outside said enclosure, said female terminal being positioned to receive said connector pin when said cap is secured to said housing.

9. A sensor as defined in claim 1 wherein cap and said housing each have substantially the same asymmetrical cross-sectional configuration.

10. A sensor as defined in claim 1 wherein said tube includes first and second tube sections detachably secured to each other, a tube connector securing said first and second tube sections to each other, said tube connector including means for connecting and disconnecting said conductor means.

11. A sensor as described in claim 1 wherein said tube is flexible.

12. A liquid level sensor comprising:
a housing defining an enclosure therein,
an electronic circuit assembly positioned within said enclosure for detecting input signals and producing output signals in response thereto;
a passage extending through said housing;
a cap detachably securable to said housing, said cap including a top portion and an elongate tube extending therefrom, said tube being insertable within said passage;
a sensing device positioned near one end of said tube, said sensing device being sensitive to the presence or absence of a liquid;
conductor means extending through said tube from said sensing device; and
means for electrically connecting and disconnecting said circuit assembly and said conductor means as said cap is secured to and removed from said housing.

13. A sensor as described in claim 12 wherein said housing includes an elongate base portion, said passage being cylindrical and extending through said base portion, and means for securing said base portion to an engine dipstick tube.

14. A sensor as defined in claim 12 wherein said tube is flexible.

15. A sensor as defined in claim 12 including a printed circuit board mounted within said enclosure, a pin connector connected to said board and extending from said enclosure, said cap including a female terminal for receiving said pin connector, and said female terminal being connected to said conductor means.

16. A snesor as described in claim 15 including a socket defined by said housing and means for electrically connecting said socket and said printed circuit board.

17. A sensor as described in claim 12 wherein said tube includes first and second detachable sections.

18. A sensor as described in claim 12 wherein said housing and said cap each have substantially the same asymmetrical cross-sectional configuration.

19. A sensor as described in claim 12 wherein said cap includes a handle having an opening therein.

* * * * *